Aug. 20, 1963         S. R. LOUGHMAN         3,100,923
CUFF LINK
Filed Feb. 20, 1961
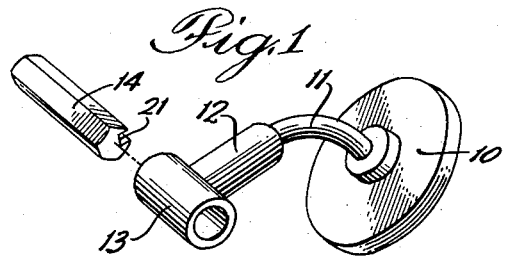
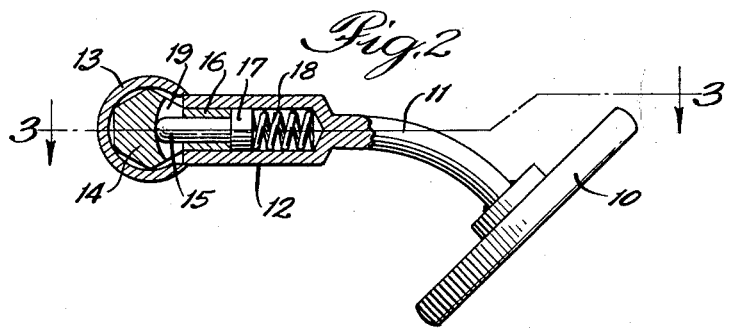
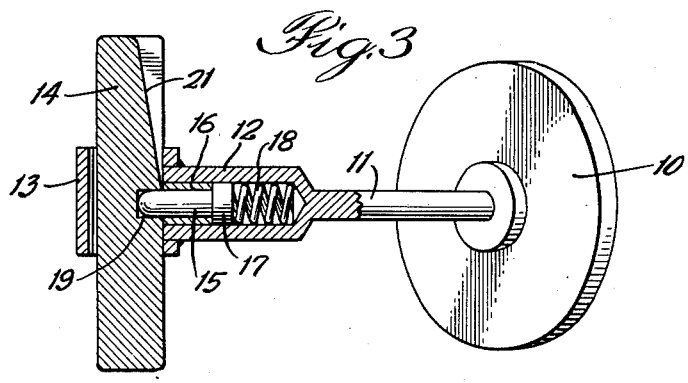
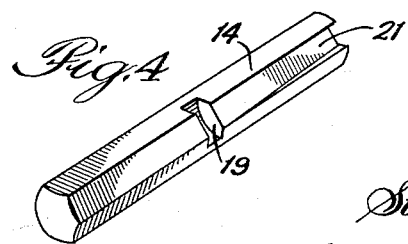
INVENTOR:
Stephen R. Loughman,
BY
ATTORNEYS.

3,100,923
CUFF LINK
Stephen R. Loughman, % Nicoud Mfg. Co.,
3220 W. Grand Ave., Chicago, Ill.
Filed Feb. 20, 1961, Ser. No. 90,372
2 Claims. (Cl. 24—100.5)

This invention relates to cuff links and more particularly to a novel retaining bar structure and mounting and securing means therefor.

Cuff links as heretofore manufactured have generally comprised a head or button from which a bifurcated shank extends and a retainer bar pivoted at its center between the arms of the shank to swing from one position aligned with the shank for insertion and removal to a retaining position transverse to the shank. In such constructions, the shank is necessarily relatively large and bulky so that it tends to crowd the button holes through which it is inserted and to cause wrinkling around the button holes. Also, the shank must have a length equal to more than half of the length of the retainer bar so that the retainer bar can be swung over a cuff fabric from one of its positions to the other. This means, however, the retainer bar would be relatively sort, shorter than desired in many cases, or that the shank would be longer than desired. Further, in such cuff links, the shank must be substantially straight, at least throughout the portion thereof overlapped by the retainer bar when it is aligned with the shank. These various considerations have substantially limited the designer in the production of attractive and securely mountable cuff links.

Perhaps a more serious consideration is the likelihood that the retainer bar may be tilted accidentally by engagement with the body of the user or with extraneous objects. If it is so tilted, the cuff link may become lost and this becomes a very serious consideration in the case of relatively valuable cuff links. It is therefore an object of the present invention to provide a cuff link which gives the designer substantially complete freedom of design in the shaping and proportions of the parts and which is securely retained on a cuff against the possibility of accidental removal.

Another object is to provide a cuff link in which the retainer bar is completely removed from the shank, but is securely held locked thereon when in use.

According to a feature of the invention, the retainer bar is held by a locking pin fitting into a transverse groove across one side only thereof and which pin is cammed out of the groove for removal of the retainer bar by turning the retainer bar. Preferably, the retainer bar is formed with a cam wedging surface extending from one end thereof to the transverse groove to engage the pin and cam it out of the way when the retainer bar is being inserted.

The above and other objects and features of the invention will be more readily apparent from the following description when read in connection with the accompanying drawing, in which:

FIGURE 1 is a perspective view of a cuff link embodying the invention with the retainer bar removed;

FIGURE 2 is an enlarged transverse section of the assembled cuff link;

FIGURE 3 is a section on the line 3—3 of FIGURE 2; and

FIGURE 4 is a perspective view of the retainer bar.

The cuff link, as shown, comprises a head or button 10 which may be of any desired size and shape and which may be decorated or jeweled, as desired, to present a pleasing appearance. The back side of the head 10 is connected to a shank 11 which, as shown, may be curved in one plane to cause the head to lie flat against a cuff when in use. At its outer end, the shank is formed with an enlarged portion 12 having a longitudinal bore therein opening radially into a short collar or sleeve 13 transverse to the shank.

The collar or sleeve 13 is symmetrically positioned across the end of the shank and is of a length substantially equal to its diameter to slip easily through the holes in a shirt cuff without twisting or turning.

The collar or sleeve 13 is adapted to receive an elongated retainer bar 14 which is of a size to slip through the collar to be held thereby in transverse relationship to the shank. In accordance with the present invention, the retainer bar can be made of any desired length and is in no way limited relative to the length of the shank itself. Preferably, the retainer bar has a non-circular surface being shown as hexagonal in section, although this is not essential.

In order to secure the retainer bar in the collar 13, a locking pin 15 is slidably mounted in the bore in the shank portion 12 to project radially into the collar. As best seen in FIGURES 2 and 3, the pin 15 fits slidably in a sleeve 16 having a press fit in the bore in the shank portion 12 and is provided with an enlarged head 17 engageable with the inner end of the sleeve 16 to limit movement of the pin. A spring 18 engages the head 17 to urge the pin radially into the collar.

The retainer bar is formed centrally of its length with a transverse slot 19 extending across one side only of the circumference of the bar and which is preferably arcuate at its bottom, as shown in FIGURE 2. One or both ends of the retainer bar are relieved in alignment with the slot 19 to define a wedge surface 21 tapering from one end of the retainer bar to the transverse groove 19.

When the retainer bar is removed from the collar and is to be inserted, it is turned to a position such that one of the wedge surfaces 21 is aligned with the end of the pin 15. As the retainer bar is pushed into the collar, the wedge surface will cam the pin 15 out of the collar and into the bore in the shank until the transverse groove 19 is aligned with the pin. At this time, the pin will snap out to the position shown in FIGURES 2 and 3 in the groove 19 securely to hold the retainer bar in place in the collar. It will be noted that the sides of the groove may be square and may engage parallel surfaces on the pin 15 so that lengthwise force applied to the retainer bar in either direction will not act to force the pin out of the groove.

To remove the retainer bar for removal of the cuff link, it may be grasped at one end and turned about its own axis. As the retainer bar is turned, the bottom surface of the groove 19 will cam the pin 15 out of the groove so that after the retainer bar has been turned through an angle approximately 60° or slightly more, it will engage a flat side surface of the retainer bar. At this time, the retainer bar can be pulled freely out of the collar so that the cuff link can be removed from a cuff on which it is mounted or is free to be mounted on a cuff by threading the shank through the holes in the cuff and then reinserting the retainer bar.

While one embodiment of the invention has been shown and described herein, it will be understood that it is illustrative only and not to be taken as a definition of the scope of the invention, reference being had for this purpose to the appended claims.

What is claimed is:

1. A cuff link comprising a head, a shank projecting from the head, a collar at the end of the shank extending transversely thereto symmetrically across the end of the shank and of a length substantially equal to its diameter, a retainer bar rotatable in and slidable through the collar, a spring pressed locking pin slidable in the shank and resiliently urged radially into the collar, the retainer bar having a transverse groove defined by substantially square sides across one side only thereof to receive the end of the locking pin thereby to lock the bar in the collar, the bottom of the groove being a smooth continuous surface and camming the locking pin from the groove when the retainer bar is turned about its axis so that the retainer bar can slide out of the collar.

2. A cuff link comprising a head, a shank projecting from the head, a collar at the end of the shank extending transversely thereto symmetrically across the end of the shank and of a length substantially equal to its diameter, a retainer bar slidable through the collar, a spring pressed locking pin slidable in the shank and resiliently urged radially into the collar, the retainer bar having a transverse groove defined by substantially square sides across one side only thereof to receive the end of the locking pin thereby to lock the bar in the collar, one end of the retainer bar having a longitudinally tapered wedging surface leading from the end of the bar to the groove to slide over the locking pin and cam it out of the collar when the retainer bar is slid into the collar, the side portions of the groove camming the locking pin from the groove when the retainer bar is turned about its axis so that the retainer bar can slide out of the collar.

References Cited in the file of this patent

UNITED STATES PATENTS

| | | |
|---|---|---|
| 820,682 | Sylvester | May 15, 1906 |
| 1,683,384 | Durham et al. | Sept. 4, 1928 |
| 2,350,565 | Mills | June 6, 1944 |
| 2,357,045 | Hayer | Aug. 29, 1944 |
| 2,612,377 | Edens | Sept. 30, 1952 |
| 2,662,773 | Parsons | Dec. 15, 1953 |